United States Patent
Wang et al.

(10) Patent No.: US 11,595,303 B2
(45) Date of Patent: Feb. 28, 2023

(54) PACKET HANDLING IN SOFTWARE-DEFINED NETWORKING (SDN) ENVIRONMENTS

(71) Applicant: VMware, Inc., Palo Alto, CA (US)

(72) Inventors: Yusheng Wang, Beijing (CN); Donghai Han, Beijing (CN); Danting Liu, Beijing (CN); Quan Tian, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 219 days.

(21) Appl. No.: 16/538,855

(22) Filed: Aug. 13, 2019

(65) Prior Publication Data
US 2020/0389399 A1 Dec. 10, 2020

(30) Foreign Application Priority Data
Jun. 10, 2019 (CN) .................. PCT/CN2019/090578

(51) Int. Cl.
*H04L 45/00* (2022.01)
*H04L 45/64* (2022.01)
*G06F 9/455* (2018.01)
*H04L 47/125* (2022.01)

(52) U.S. Cl.
CPC .......... *H04L 45/66* (2013.01); *G06F 9/45558* (2013.01); *H04L 45/64* (2013.01); *H04L 47/125* (2013.01); *G06F 2009/45595* (2013.01)

(58) Field of Classification Search
CPC ....... H04L 45/66; H04L 47/125; H04L 45/64; G06F 9/45558; G06F 2009/45595

USPC ......................................................... 709/238
See application file for complete search history.

(56) References Cited

U.S. PATENT DOCUMENTS

| | | | |
|---|---|---|---|
| 9,571,300 B2 * | 2/2017 | Barabash | H04L 12/4633 |
| 2009/0290501 A1 * | 11/2009 | Levy | H04L 49/70 370/250 |
| 2014/0269709 A1 * | 9/2014 | Benny | H04L 61/2007 370/392 |
| 2016/0188527 A1 * | 6/2016 | Cherian | H04L 69/22 709/212 |
| 2017/0034224 A1 * | 2/2017 | Baram | H04L 65/605 |
| 2017/0180273 A1 * | 6/2017 | Daly | H04L 69/324 |
| 2017/0279722 A1 * | 9/2017 | Amulothu | H04L 47/125 |
| 2018/0006935 A1 * | 1/2018 | Mutnuru | H04L 45/42 |
| 2018/0278541 A1 * | 9/2018 | Wu | H04L 47/76 |

(Continued)

*Primary Examiner* — Philip C Lee
(74) *Attorney, Agent, or Firm* — Su IP Consulting

(57) ABSTRACT

Example methods and systems for packet handling in a software-defined networking (SDN) environment are disclosed. One example method may comprise detecting an egress application-layer message from a first logical endpoint supported by a first host; and identifying a second logical endpoint supported by the second host for which the egress application-layer message is destined. The method may also comprise generating an egress packet that includes the egress application-layer message and metadata associated with the second logical endpoint, but omits one or more headers that are addressed from the first logical endpoint to the second logical endpoint. The method may further comprise sending the egress packet to the second host to cause the second host to identify the second logical endpoint based on the metadata, and to send the egress application-layer message to the second logical endpoint.

21 Claims, 6 Drawing Sheets

(56) References Cited

U.S. PATENT DOCUMENTS

2019/0312820 A1* 10/2019 Yu .......................... H04L 47/36
2019/0334868 A1* 10/2019 Tewari ................ G06F 9/45558

* cited by examiner

PACKET HANDLING IN SOFTWARE-DEFINED NETWORKING (SDN) ENVIRONMENTS

CROSS-REFERENCE TO RELATED APPLICATION

The present application U.S. Patent application Ser. No. 16/538,855) claims the benefit under 35 U.S.C. § 119(a) of Patent Cooperation Treaty (PCT) Application No. PCT/CN2019/090578, filed Jun. 10, 2019, which is incorporated herein by reference.

BACKGROUND

Virtualization allows the abstraction and pooling of hardware resources to support virtual machines in a software-defined networking (SDN) environment, such as a software-defined data center (SDDC). For example, through server virtualization, virtual machines (VMs) running different operating systems may be supported by the same physical machine (also referred to as a "host"). Each virtual machine is generally provisioned with virtual resources to run an operating system and applications. The virtual resources may include central processing unit (CPU) resources, memory resources, storage resources, network resources, etc. In practice, multiple protocol layers are implemented in the SDN environment to facilitate packet communication among logical endpoints such as VMs. However, as network protocol stacks become thicker and more complicated, the additional complexity may affect performance.

DETAILED DESCRIPTION

Figure 1:
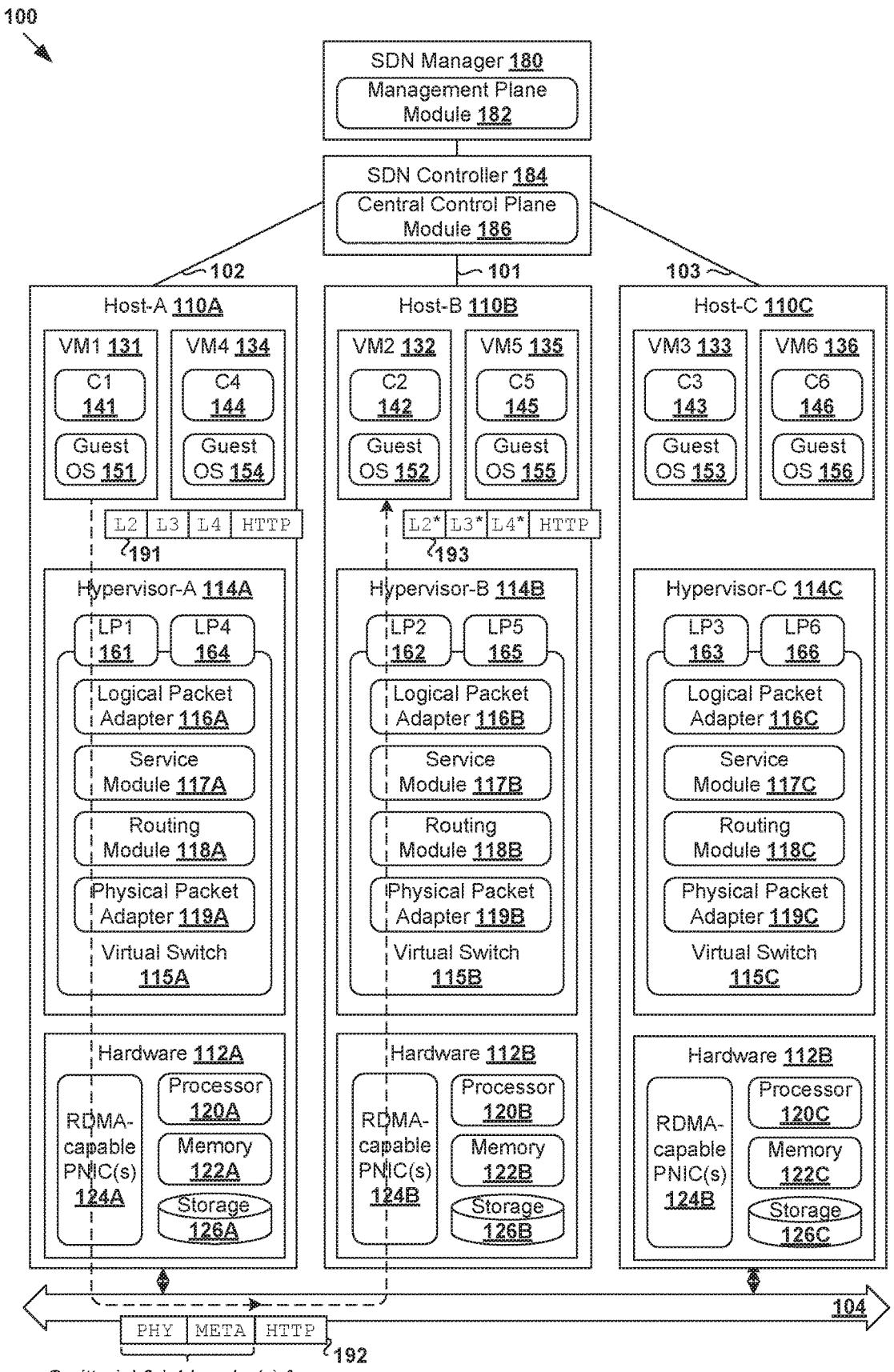
FIG. 1 is a schematic diagram illustrating an example software-defined networking (SDN) environment in which packet handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to packet handling will now be explained in more detail using FIG. 1, which is a schematic diagram illustrating example software-defined networking (SDN) environment 100 in which packet handling may be performed. It should be understood that, depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs 131-136. The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. Hypervisor 114A/114B/114C maintains a mapping between underlying hardware 112A/112B/112C and virtual resources allocated to respective VMs 131-136.

Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc. Virtual resources are allocated to respective VMs 131-136 to support respective guest operating systems (OS) 151-156 and applications 141-146 (e.g., containerized applications to be discussed below). The virtual resources may include virtual CPU, guest physical memory, virtual disk, virtual network interface controller (VNIC), etc. Hardware resources may be emulated using virtual machine monitors (VMMs). VNICs for VMs 131-136 may be emulated by corresponding VMMs instantiated by their respective hypervisor at respective hosts 110A-C.

Although examples of the present disclosure refer to VMs, it should be understood that a "virtual machine" running on a host is merely one example of a "logical endpoint," "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

For example, container technologies may be used to run various containers 141-146 (labelled "C1" to "C6") inside respective VMs 131-136. As used herein, the term "container" (also known as "container instance") is used generally to describe an application that is encapsulated with all its dependencies (e.g., binaries, libraries, etc.). Containers 141-146 may be implemented using any suitable container technology, such as Docker (www.docker.com), Linux (http://linuxcontainers.org), etc. Unlike VMs, containers 141-146 are "OS-less", meaning that they do not include any OS that could weigh 10s of Gigabytes (GB). This makes containers 141-146 more lightweight, portable, efficient and suitable for delivery into an isolated OS environment. Running containers inside a VM (known as "containers-on-virtual-machine" approach) not only leverages the benefits of container technologies but also that of virtualization technologies. A particular VM may support multiple containers.

Hypervisor 114A/114B/114C further implements virtual switch 115A/115B/115C to handle egress packets from, and ingress packets to, corresponding VMs 131-136. Packets may be received from, or sent to, each VM via an associated logical port. For example, logical switch ports 161-166 (see "LP1" to "LP6") are associated with respective VMs 131-136. Here, the term "packet" may refer generally to a group of bits that can be transported together, and may be in another form, such as "frame," "message," "segment," etc. The term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. Logical switches providing logical layer-2 connectivity and logical distributed routers (DRs) providing logical layer-3 connectivity may be implemented in a distributed manner and span multiple hypervisors 114A-C on respective hosts 110A-C.

Through virtualization of networking services, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks.

SDN manager 180 and SDN controller 184 are example network management entities in SDN environment 100. One example of an SDN controller is the NSX controller component of VMware NSX® (available from VMware, Inc.) that operates on a central control plane. SDN controller 184 may be a member of a controller cluster (not shown for simplicity) that is configurable using SDN manager 180 operating on a management plane. To send or receive control information, a local control plane (LCP) agent (not shown for simplicity) on host 110A/110B/110C may interact with central control plane (CCP) module 186 at SDN controller 184 via control-plane channel 101/102/103. CCP module 186 may interact with management plane module 182 supported by SDN manager 182. Network management entity 184/180 may be implemented using physical machine(s), VM(s), or both.

Hosts 110A-C may maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header (also known as a tunnel header) identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-C 114C implements a third VTEP with (IP-C, MAC-C, VTEP-C), etc.

To facilitate data-plane communication among VMs 131-136 that are connected via logical networks in SDN environment 100, packets are generally encapsulated with multiple layers of header information. For example, a hypertext transfer protocol (HTTP) request from VM1 131 on host-A 110A to VM2 132 on host-B 110B may be encapsulated with an inner header and an outer header. To facilitate routing within a logical network domain, the inner header may be addressed from source VM1 131 and destination VM2 132, and include an inner layer-4 header, an inner layer-3 header and an inner layer-2 header. Here, the term "layer-2" or "L2" may refer generally to a link layer or media access control (MAC) layer; "layer-3" or "L3" to a network or Internet Protocol (IP) layer; and "layer-4" or "L4" to a transport layer (e.g., using Transmission Control Protocol (TCP), User Datagram Protocol (UDP), etc.) in the TCP/IP model, although the concepts described herein may be used with other networking models (e.g., Open System Interconnection (OSI) model).

To facilitate routing within a physical network domain, the outer header may be addressed from source host-A 110A to destination host-B 110B. Depending on the desired implementation, the outer header may include a GENEVE header, an outer UDP header, an outer IP header and an outer MAC header. Using the "multi-layer routing" approach, the HTTP request may be transmitted from host-A 110A to host-B 110B based on the outer header, and subsequently to VM2 132 based on the inner and GENEVE headers. As a network stack or protocol suite becomes more complicated, additional protocol layers are built on top of existing ones. In SDN environment 100, the implementation of new paradigms, policies or services may require additional protocol layer(s), which potentially increases the size of packet header information and/or packet header processing operations. In various scenarios, the additional complexity may affect performance due to increased resource consumption, such as in terms of CPU, memory and network resources. This may also increase complexity in the management domain and data-plane domain.

Packet Handling Based on Metadata

According to examples of the present disclosure, the complexity associated with thick network protocol stacks may be reduced by omitting some protocol layer(s) and associated header(s) from packets that are transported among hosts. For example in FIG. 1, to facilitate packet transmission from a first logical endpoint (e.g., VM1 131 or C1 141) to a second logical endpoint (e.g., VM2 132 or C2 142) within a logical network domain, metadata that identifies the second logical endpoint may be included in packets that are transmitted from a first host (e.g., 110A) to a second host (e.g., 110B). Using metadata that is more compact than the omitted header(s), the processing burden relating to header information processing may be reduced, thereby reducing resource consumption and improving performance. As used herein, the term "logical endpoint" may refer generally to an element that is connected to a logical network, such as a VM, a VNIC, a container or application running inside a VM, etc.

Figure 2:
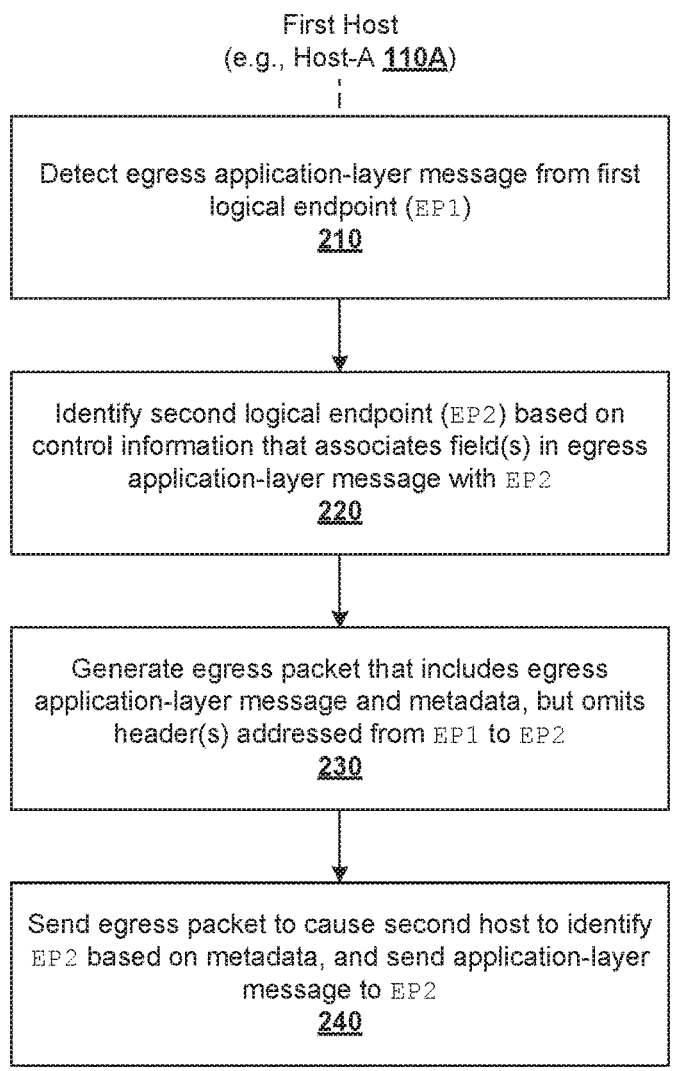
FIG. 2 is a flowchart of an example process for a first host to perform packet handling in an SDN environment.

In more detail, FIG. 2 is a flowchart of example process 200 for a first host to perform packet handling in SDN environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In the following, an example will be described using host-A 110A as a "first host," host-B 110B as a "second host," VM1 131 as a "first logical endpoint," and VM2 132 as "second logical endpoint." Although the terms "first" and "second" are used to describe various elements, these elements should not be limited by these terms. These terms are used to distinguish one element from another. For example, a first element may be referred to as a second element, and vice versa. Any logical endpoint may each perform the role of a "first logical endpoint" or a "second logical endpoint."

At 210 and 220 in FIG. 2, in response to detecting an egress application-layer message from C1 141 running inside VM1 131 ("first logical endpoint"), host-A 110A identifies that the egress application-layer message is destined for C2 142 running inside VM2 132 ("second logical endpoint") supported by host-B 110B. Block 220 may be performed based on control information that associates C2 142 with at least one attribute (e.g., domain name=bookstore-A, logical IP address=9.1.1.1, etc.) specified by the egress application-layer message (e.g., HTTP request). As will be discussed further using FIG. 4, the control information may be obtained from management entity 180/184 via control-plane channel 101/102/103.

As used herein, the term "application-layer message" may refer generally to any suitable information generated by a logical endpoint according to an application-layer protocol. The "application-layer protocol" may be defined according to OSI model, Internet Protocol (IP) suite, etc. Examples of an "application-layer protocol" include, but not limited to, HTTP, HTTP secure (HTTPS), file transfer protocol (FTP), Simple Mail Transfer Protocol (SMTP), etc. In the following, various examples will be discussed using application-layer messages in the form of HTTP requests. In practice, any alternative and/or additional application-layer protocols may be used.

At 230 and 240 in FIG. 2, host-A 110A generates and sends an egress packet (see 192 in FIG. 1) to host-B 110B. Egress packet 192 includes the egress application-layer message (e.g., HTTP request) and metadata associated with C2 142, but omits header(s) addressed from C1 141 to C2 142. Egress packet 192 may be sent to host-B 110B to cause host-B 110B to identify C2 142 based on the metadata, and to send the egress application-layer message to C2 142 (see 193 in FIG. 1). In practice, the "metadata" in block 230 may include any suitable information based on which C2 142 may be uniquely identified by second host-B 110B. As will be described using FIGS. 3-6, the metadata may include a logical domain ID (e.g., domain=D1 in FIG. 4), an application-layer attribute (e.g., domain name=bookstore-a2.com), etc. In some cases, a physical address (e.g., RDMA address) in egress packet 192 may be used as the metadata, provided the physical address is uniquely mapped to C2 142.

Figure 5:
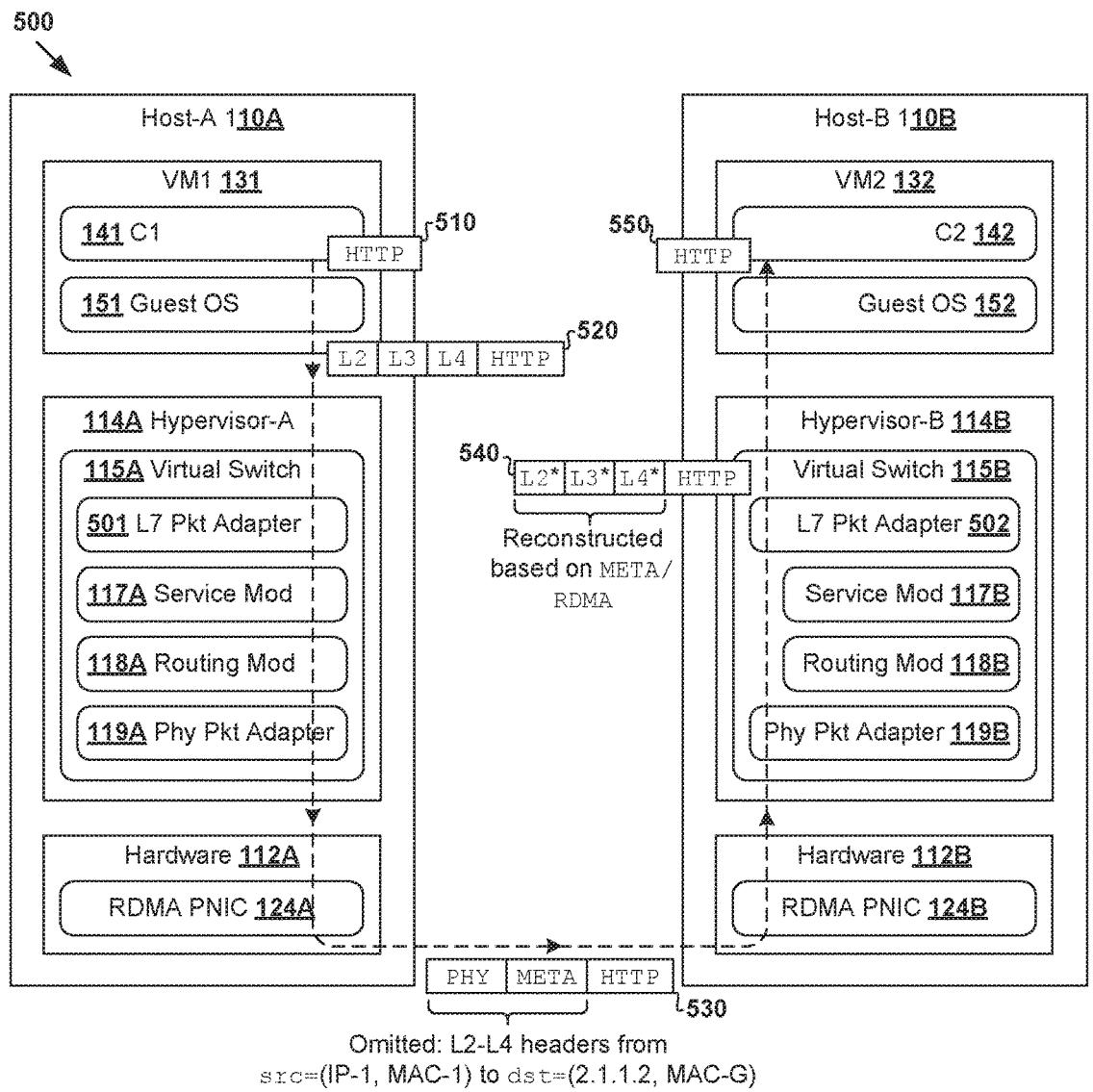
FIG. 5 is a schematic diagram illustrating a first example of packet handling in an SDN environment.

In a first example in FIG. 5, the application-layer message (e.g., HTTP request) detected at block 210 may be encapsulated with various headers, such as a layer-4 ("L4") TCP header, layer-3 ("L3") IP header and layer-2 ("L2") MAC header. In this case, block 230 may involve host-A 110A omitting the L2-L4 headers in the egress packet sent to destination host-B 110B. Depending on the desired implementation, the omitted L2-L4 headers may be reconstructed at host-B 110B based on the metadata. In a second example in FIG. 6, the application-layer message (e.g., HTTP request) may be detected at block 210 via application programming interface (API) invocation, in which case packet header trimming and reconstruction is not necessary.

Examples of the present disclosure may be implemented to support service-to-service communication (e.g., using a service mesh in FIG. 4), VM networking, container networking, application networking, etc. By reducing the size of packet header information and associated processing burden, examples of the present disclosure may be implemented to reduce routing complexity and improve network performance. As will be discussed further below, examples of the present disclosure may be implemented by any suitable host 110A/110B/110C and more specifically virtual switch 115A/115B/115C, such as using logical packet adapter(s) 116A/116B/116C, service module 117A/117B/117C, routing module 118A/118B/118C and physical packet adapter(s) 119A/119B/119C. In practice, service modules 117A-C and routing module 118A-C may be designed to be orthogonal to (i.e., independent from) respective logical packet adapters 116A-C (e.g., 501-502 in FIGS. 5 and 601-602 in FIG. 6) and physical packet adapters 119A-C. In this case, service modules 117A-C and routing module 118A-C may be configured to interact with different packet adapters 116A-C/119A-C, Service Mesh Implementation In the following, various examples will be described with reference to a microservice architecture. Unlike a conventional monolithic application that is self-contained and independent from other applications, a microservice architecture splits a single application into a set of modular components called "microservices." By designing microservices to be independently deployable and configurable, applications are simpler to build and maintained using the microservice architecture. Also, developers may isolate software functionality into independent microservices that are each responsible for performing specific tasks.

To support the microservice architecture, a service mesh may be implemented to facilitate service-to-service communication in a reliable manner. The term "service mesh" may refer generally to a group of microservices that make up an application, and the interactions among them. Depending on the desired implementation, the service mesh may facilitate load balancing, service discovery, authentication, support for circuit breaker pattern and other capabilities. Any suitable approach may be used for the service mesh, such as Istio™, Kong™ (available from Kong Inc.), Linkerd® and Envoy™ (available from The Linux Foundation®), NGINX™ (available from Nginx, Inc.), etc. For example, a mircoservice running on Istio may be packaged in a container and deployed using a container management system, such as Kubernetes® from The Linux Foundation®, etc.

Figure 3:
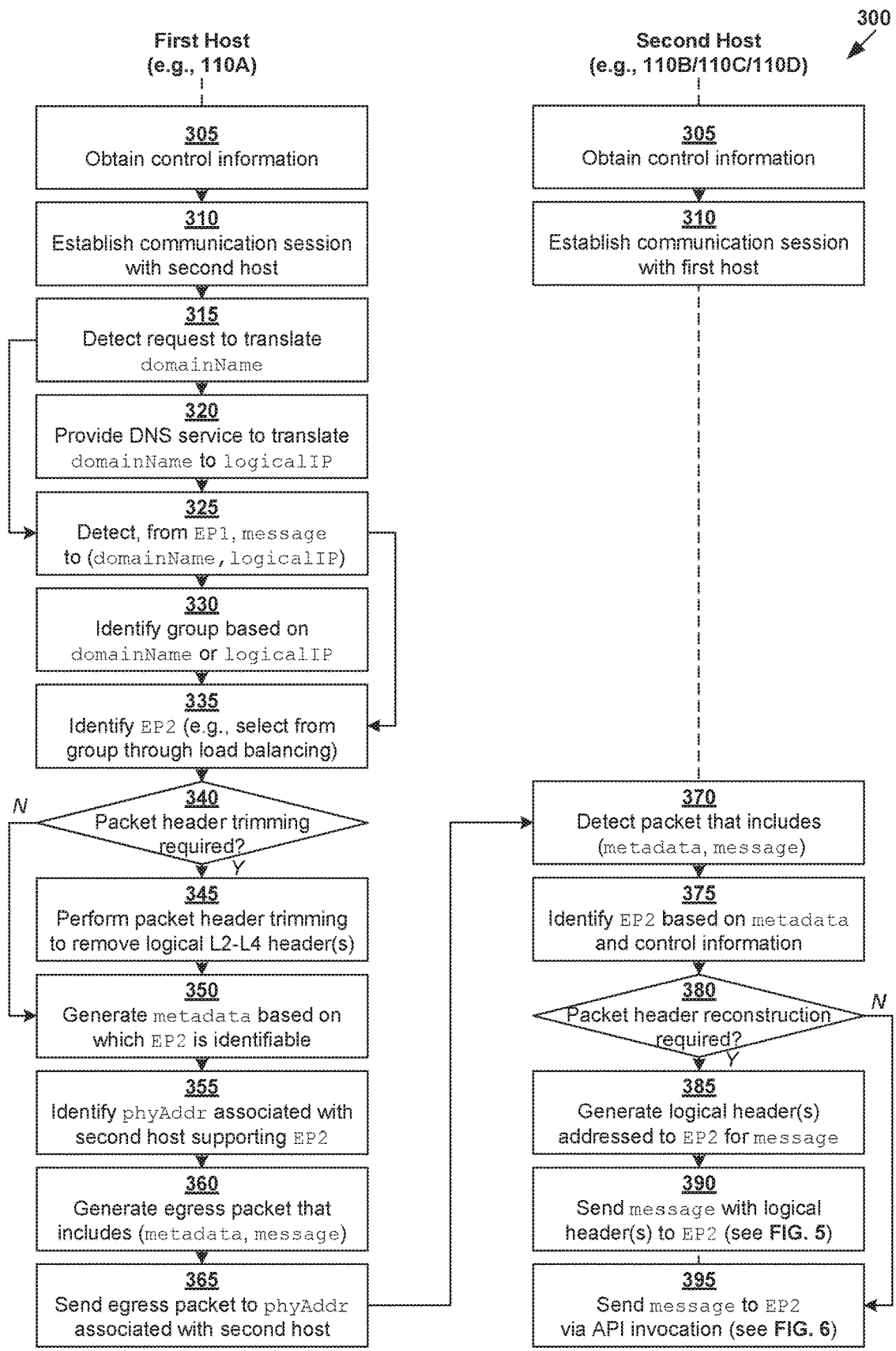
FIG. 3 is a flowchart of an example detailed process for packet handling in an SDN environment.

In more detail, FIG. 3 is a flowchart of example detailed process 300 of packet handling in SDN environment 100. Example process 300 may include one or more operations, functions, or actions illustrated at 305 to 390. The various operations, functions or actions may be combined into fewer blocks, divided into additional blocks, and/or eliminated depending on the desired implementation. Example process 300 may be performed by any suitable computer system capable of acting as host 110A/110B/110C/110D. The example in FIG. 3 will be explained using FIG. 4, which is a schematic diagram illustrating example dissemination 300 of control information to facilitate packet handling in SDN environment 100.

At 305 in FIG. 3, host 110A/110B/110C/110D may obtain, from management entity 180/184, control information 401/402/403/404 to facilitate service-to-service communication. The control information may include load balancing information 410, logical endpoint information 420 and logical endpoint placement information 430. Block 310 may be initiated by a host or management entity 180/184, and the term "obtain" may refer generally to a host retrieving or receiving the information from management entity 180/184.

Figure 4:
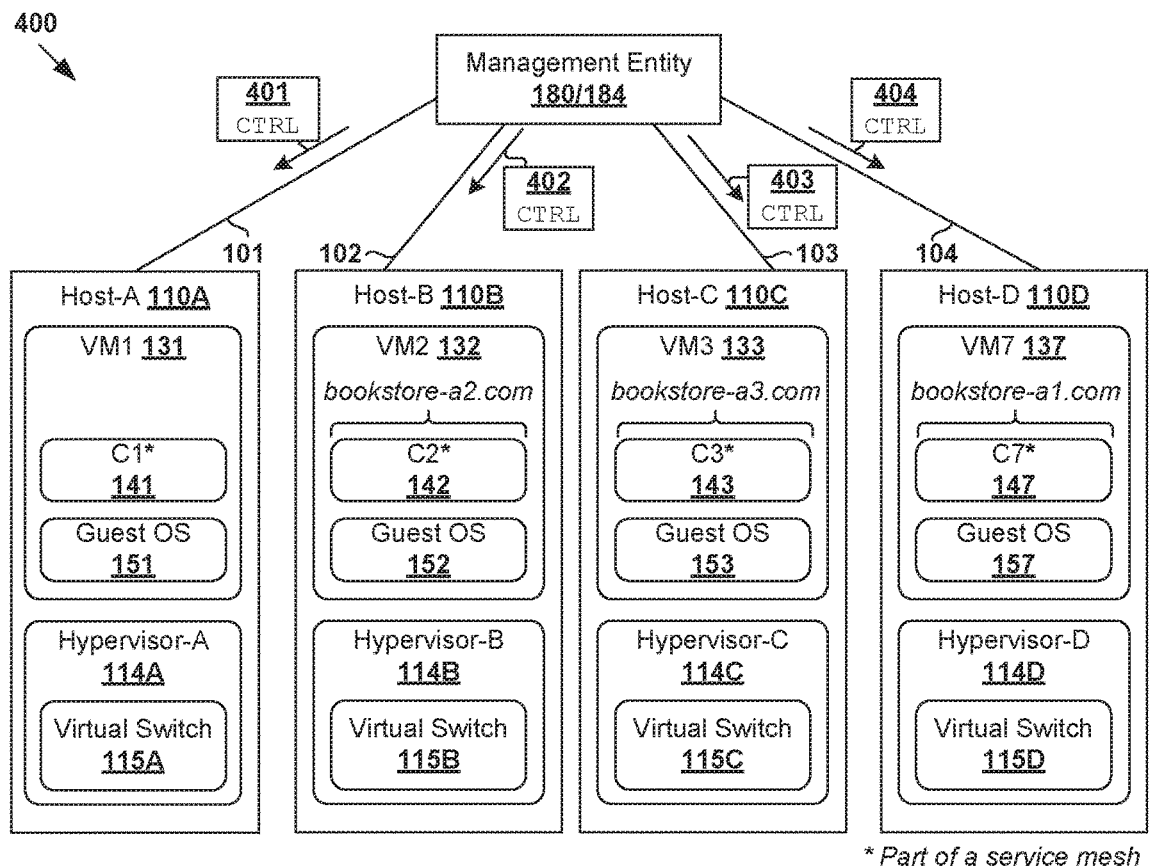
FIG. 4 is a schematic diagram illustrating example dissemination of control information to facilitate packet handling in an SDN environment.

In the example in FIG. 4, microservices that support an online bookstore may be implemented using respective C1 141 inside VM1 131 on host-A 110A, C2 142 running inside VM2 132 on host-B 110B, C3 143 running inside VM3 133 on host-C 110C, and C7 147 running inside VM7 137 on host-D 110D. For example, to search for book(s) matching a particular title in an inventory, C1 141 may generate and send a query (e.g., HTTP request) to virtual domain name=bookstore-A. Based on load balancing information 410, the HTTP request may be addressed to virtual domain name=bookstore-A, which may be mapped to bookstore-a1.com, bookstore-a2.com or bookstore-a3.com defined in routing domain=D1.

Logical endpoint information 420 specifies logical address information associated with each domain name. Referring to 421, domain name="bookstore-A" is associated with (logical IP address=9.1.1.1, logical MAC address=MAC-A). Within a particular routing domain or routing scope (e.g., D1), a logical IP address must be unique. Referring to 422-424, domain name="bookstore-a1.com" is associated with (2.1.1.1, MAC-a1); "bookstore-a2.com" with (2.1.1.2, MAC-a2) and "bookstore-a3.com" with (2.1.1.3, MAC-a3), respectively.

Logical endpoint placement information 430 identifies the physical placement associated with each domain name. At 431 in FIG. 4, C7 147 running inside VM7 137 implements a first microservice associated with domain name="bookstore-a1.com," which is mapped to host ID=host-D 110D, physical endpoint address=RDMA(k1, a1) and endpoint ID=(port-2, vlan-1). At 432 in FIG. 4, C2 142 running inside VM2 132 implements a second micro service application associated with domain name="bookstore-a2.com," which is mapped to host-B 110B, RDMA(k2, a2) and (port-5, vlan-2). At 433 in FIG. 4, C3 143 running inside VM3 133 implements a third micro service application associated with domain name="bookstore-a3.com," which is mapped to host-C 110C, RDMA(k3, a3) and (port-3, vlan-1).

In practice, the "endpoint ID" may include multiple layers of identification information, such as a port ID identifying a particular VM supported by a host, and a virtual local area network (VLAN) ID identifying a container running inside the VM. Using (port-3, vlan-1) as an example, port ID=port-3 may be used to identify VM3 133 on host-C 110C, and VLAN ID=vlan-1 to identify container C3 143. In practice, any alternative format for the endpoint ID may be used. Physical address such as RDMA(k3, a3) refers to an address of physical host-C 110C on physical network 104. In practice, the "physical address" may refer generally to an address seen by a physical entity (e.g., physical NIC), and the "logical address" to an address seen by a logical endpoint (e.g., VM, container, etc.).

At 310 in FIG. 3, a host may establish a communication session with another host to facilitate service mesh implementation. In the example in FIG. 4, logical endpoint placement information 430 may be used to establish a communication session between a pair of hosts, such as an RDMA-based connection. For example, host-A 110A may establish a first RDMA-based connection with host-D 110D using physical endpoint address=RDMA(k1, a1). A second RDMA-based connection may be established with host-B 110B using RDMA(k2, a2), and a third RDMA-based connection with host-C 110C using RDMA(k3, a3). The actual format for the physical address (e.g., RDMA(k1, a1)) may vary for different RDMA protocols.

As used herein, the term "RDMA" may refer to an approach that enables direct memory access from the memory of one computer system to the memory of another computer system via an interconnected network. Any suitable RDMA protocol may be used to establish RDMA-based connections, such as RDMA over converged Ethernet (RoCE) version 1, 2 or any other version, InfiniBand® (IB, a trademark of the InfiniBand Trade Association), RDMA over TCP/IP (iWARP), Virtual Interface Architecture (VIA), Omni-Path (a trademark of the Intel Corporation), etc. IB is a computer networking communications standard used in high-performance computing that features relatively high throughput and low latency. RoCE is a networking protocol that allows RDMA over an Ethernet network. RoCE version 1 (RoCEv1) is an Ethernet link layer protocol that allows communication between any two hosts on the same Ethernet broadcast domain. RoCE version 2 (RoCEv2) is an IP-based protocol that allows communication via a layer-3 network. An "RDMA-capable NIC" (e.g., 124A/124B/124C in FIG. 1) may refer generally to any suitable network adapter that is capable of sending or receiving traffic via the RDMA-based connection.

In practice, an RDMA-based connection may be established using any suitable library calls (known as "verbs" library calls). These library calls provide semantic description of a required behavior, and are used for managing control path objects by creating and destroying objects such as send and receive work queue pairs, completion queues and memory regions. For example, host-A 110A may use library call=rdma_connect( ) to initiate a connection request with host-B 110B. In response, host-B 110B may accept the connection request using rdma_bind( ), rdma_listen( ) rdma_accept( ) etc.

First Example: Packet Header Trimming and Reconstruction

A first example based on packet header trimming and reconstruction will be exampled using FIG. 3 and FIG. 5. In particular, FIG. 5 is a schematic diagram illustrating first example 500 of packet handling in SDN environment 100. Here, consider a scenario where microservice supported by container C1 141 on host-A 110A issues an application-layer message specifying an "attribute" in the form of virtual domain name=bookstore-A. For example, the application-layer message may be a representational state transfer (RESTful) request="GET http://bookstore-A/book?title=SDN" (see 510) to search for books with string="SDN" in their title. Any alternative HTTP request may be issued, such as HEAD, PUT, POST, DELETE, etc. In the example in FIG. 5, logical packet adapter 116A/116B in FIG. 1 may be in the form of layer-7 packet adapter 501/502 to handle header removal and/or reconstruction.

(a) Source Host-A 110A

At 315 and 320 in FIG. 3, virtual switch 115A may provide a domain name system (DNS) service to translate domain name="bookstore-A" to logical IP address=9.1.1.1 based on load balancing information 410 and logical endpoint information 420. To provide the DNS service, virtual switch 115A may implement a meta packet service to act as a DNS server (not shown for simplicity). The DNS server may be configured by management entity 180/184 and deployed on a logical network to which C1 141 is connected. The DNS server may determine that it is backed by a pool of micro service applications, and respond with logical IP address=9.1.1.1, which is a special IP address assigned to virtual domain name=bookstore-A. Note that it is not necessary to translate the domain name to the logical IP address when native API invocation (to be discussed using FIG. 6) is used.

At 325 in FIG. 3, VM1 131 generates and sends a packet (see 510-520) that is addressed to logical IP address=9.1.1.1 associated with virtual domain name="bookstore-A". In the example in FIG. 5, packet 520 includes HTTP request 510 that is encapsulated with logical network header information 521-523. Logical TCP header 521 specifies any suitable information to establish a TCP connection with IP address=9.1.1.1. Logical IP header 522 identifies (source IP address=IP-1, destination IP address=9.1.1.1), while logical MAC header 523 identifies (source MAC address=MAC-1, destination MAC address=MAC-G). In this example, IP-1 is in a different subnet compared to 9.1.1.1, in which case "MAC-G" represents a destination MAC address associated with a gateway (e.g., edge) capable of forwarding the packet to the destination. Note that (IP-1, MAC-1) are associated with VM1 131, or more particularly C1 141 running inside VM1 131.

At 330 in FIG. 3, virtual switch 115A determines that load balancing is required because (domain name=bookstore-A, IP address=9.1.1.1) may be mapped to (bookstore-a1.com, 2.1.1.1) associated with C7 147, (bookstore-a2.com, 2.1.1.2) associated with C2 142 and (bookstore-a3.com, 2.1.1.3) associated with C3 143. At 335, virtual switch 115A (e.g., using service module 117A and/or routing module 118A) performs load balancing by selecting (bookstore-a2.com, 2.1.1.2) to handle the HTTP request.

In other words, destination C2 142 is selected from a group of logical endpoints that are capable of processing the HTTP request. The request to establish a TCP connection is terminated locally on a proxy running on hypervisor-A 114A. As will be described below, destination hypervisor-B 114B may run a similar proxy. In practice, any suitable load balancing approach may be used, such as round robin, historical connection information, a hash function based on source IP address, etc. Further, liveness detection may be performed periodically (e.g., using a meta packet service) to determine whether "bookstore-a1.com," "bookstore-a2.com," and "bookstore-a3.com" are running.

At 340 (yes) and 345 in FIG. 3, virtual switch 115A performs packet header trimming to reduce the amount of header information in packet 520 from VM1 131. Depending on the desired implementation, logical packet adapter 116A may be configured to process packet 520 to remove any "unnecessary" header information that may be reconstructed at the destination based on control information 410-430 in FIG. 4. For example, packet header trimming may be performed to remove logical TCP header 521, logical IP header 522, logical MAC header 523, or any combination thereof.

At 350 in FIG. 3, virtual switch 115A generates metadata based on which C2 142 may be identified at the destination host. In the example in FIG. 5, the metadata (see 531) may include (domain=D1, domain name="bookstore-a2.com"), which uniquely identifies C2 142 having endpoint ID=(port-5, vlan-2) within domain=D1. In practice, any alternative and/or additional metadata may be used. For example, since physical address=RDMA(k2, a2) is uniquely associated with endpoint ID=(port-5, vlan-2) within domain=D1, the physical address may be used as the metadata, In this case, it is not necessary to include domain=D1 and domain name="bookstore-a2.com" in the metadata. In another example, group or context information associated with firewall rule(s) may be included in the metadata. Further, the metadata may include any information (e.g., endpoint ID) that identifies source C1 141 to facilitate header reconstruction at the destination.

At 355 in FIG. 3, virtual switch 115A identifies physical address=RDMA(k2, a2) associated with host-B 110B based on logical endpoint placement information 432. At 360 and 365, virtual switch 115A generates and sends egress packet 530 to host-B 110B. Egress packet 530 includes physical address header 532 (labelled "PHY") specifying source=RDMA(k0, a0) and destination=RDMA(k2, a2), metadata 531 specifying (domain=D1, domain name="bookstore-a2.com") and HTTP request 510. Physical packet adapter 119A may interface with source RDMA-capable physical NIC 124A on host-A 110A to transmit egress packet 530 to destination RDMA-capable physical NIC 124B on host-B 110B via physical network 104. From a logical network perspective, egress packet 530 be forwarded via logical router(s) and logical switch(es).

(b) Destination Host-B 110B

At 370 and 375 in FIG. 3, in response to detecting packet 530, virtual switch 115B identifies destination C2 142 based on metadata 531 and logical endpoint placement information 432. In particular, based on (domain=D1, domain name="bookstore-a2.com") specified by metadata 531 and associated with endpoint ID=(port-5, vlan-2), destination=C2 142 running inside VM2 132 may be identified.

At 380 (yes) and 385, virtual switch 115B performs packet header reconstruction to by generating a logical TCP header (L4*), a logical IP header (L3*) and a logical MAC header (L2*) for HTTP request 510. The packet header reconstruction is based on metadata 531 specifying (domain=D1, domain name="bookstore-a2.com"), which may be mapped to (logical IP address=2.1.1.2, logical MAC address=MAC-a2) associated with C2 142. Physical address 532 and metadata 531 will be discarded. Depending on the desired implementation, virtual switch 115B may act as a TCP proxy to establish a TCP connection with logical IP address=2.1.1.2 and (port-5, vlan-2) associated with C2 142.

In practice, any suitable approach may be used to generate the source IP/MAC address information of C1 141. In one example, logical endpoint information 430 in FIG. 4 may further include (host ID=host-A, physical address=RDMA(k0, a0), endpoint ID=(port-4, vlan-3) for C1 141). In this case, virtual switch 115B may identify C1 141 based on source physical address=RDMA(k0, a0) in packet 530. In another example, additional metadata 531 identifying the source (e.g., "src=C1" or "src=(port-4, vlan-3)") may be added to packet 530. In a further example, a HTTP header (e.g., "X-Forwarded-For: C1") may be appended at the source.

At 390 in FIG. 3, virtual switch 115B sends the HTTP request (see 540 in FIG. 5) with reconstructed logical header(s) to VM2 132. The reconstructed headers are removed by a protocol stack of guest OS 152 of VM2 132 before HTTP request 510/550 is sent to C2 142 for processing. When responding to the HTTP request, host-B 110B may act as a "first host" and host-A 110B as a "second host" using the example in FIG. 3 to facilitate the communication between source C2 142 and destination C1 141.

Second Example: Native Network API

Figure 6:
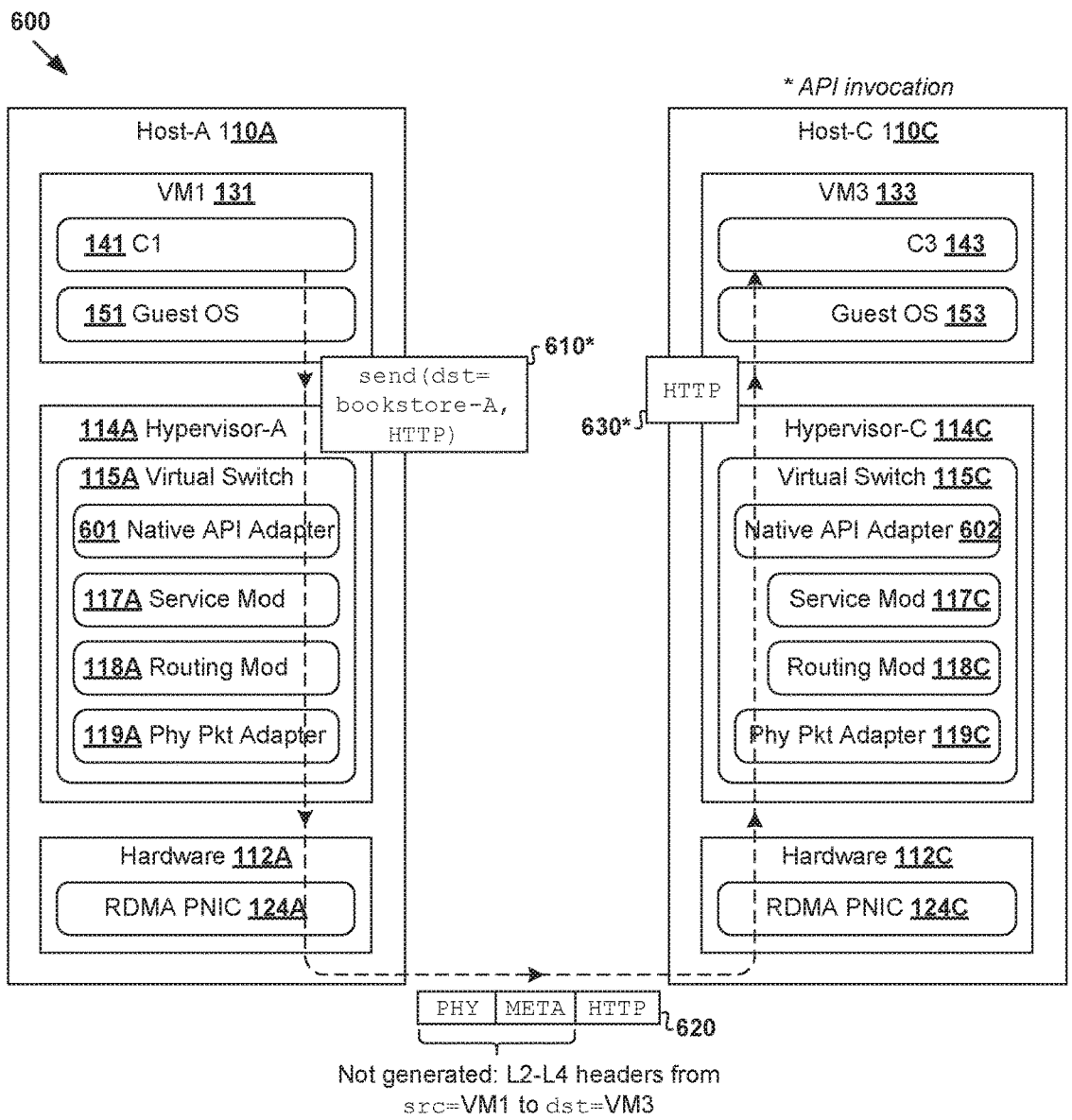
FIG. 6 is a schematic diagram illustrating a second example of packet handling in an SDN environment.

A second example based on API invocation will be explained using FIG. 3 and FIG. 6. In particular, FIG. 6 is a schematic diagram illustrating second example 500 of packet handling in SDN environment 100. Using a native network API approach, applications or microservices (e.g., C1 147) may be connected to a logical network directly without VNIC or port construction. For example in FIG. 6, logical packet adapter 116A/116B in FIG. 1 may be in the form of native API adapter 601/602 to handle API calls. Compared to the example in FIG. 5, it is not necessary to perform packet header trimming and reconstruction, and to terminate any TCP connection.

At 610 in FIG. 6, virtual switch 115A may detect a HTTP request via an API invocation, such as in the form of send(destination=bookstore-A, HTTP request). After examining load balancing information 410 and logical endpoint information 420, it is determined that load balancing is required. This is based on (bookstore-A, 9.1.1.1), which may be mapped to (bookstore-a1.com, 2.1.1.1) associated with C7 147, (bookstore-a2.com, 2.1.1.2) associated with C2 142 and (bookstore-a3.com, 2.1.1.3) associated with C3 143. In this case, virtual switch 115A (e.g., using service module 117A) performs load balancing by selecting (bookstore-a3.com, 2.1.1.3) associated with C3 143. See corresponding 325-335 in FIG. 3. Note that block 320 in FIG. 3 is not necessary in the example in FIG. 6.

Next, egress packet 620 that includes physical address 622, metadata 621 and HTTP request 610 is sent to host-C 110C. For example, based on logical endpoint information 423, metadata 621 specifying (domain=D1, domain name="bookstore-a3.com") may be generated. Based on logical endpoint placement information 433, RDMA(k3, a3) associated with host-C 110C may be identified to be destination physical address 622. See corresponding 340 (no), 350-365 in FIG. 3.

At destination host-C 110C, virtual switch 115B may identify C3 143 associated with endpoint ID=(port-3, vlan-1) based on metadata 621 specifying (domain=D1, domain name=bookstore-a3.com). As such, HTTP request 630 may be sent to C3 143 directly, such as through an API invocation by API adapter 602. Unlike the example in FIG. 5, L2-L4 packet header reconstruction is not necessary. See corresponding 370-375, 380 (no) and 395 in FIG. 3. Other implementation details explained using FIG. 5 are also applicable in the example in FIG. 6 and will not be repeated for brevity.

In the examples in FIG. 5 and FIG. 6, egress packet 530/620 includes RDMA header 532/622, metadata 531/621 and application-layer message 510/610. In these examples, one layer of routing (i.e., application-based routing) may be implemented in a more efficient manner compared to conventional multi-layer routing that relies on logical network domain headers (e.g., inner TCP header, inner IP header, inner MAC header) and physical network domain headers (e.g., outer TCP header, outer IP header, outer MAC header). Using control information 410-430 in FIG. 3, routing decisions based on metadata may be configured in a centralized manner instead of a distributed manner.

Although described using RDMA, it should be understood that any alternative communication session may be established between first host 110A and second host 110B/110C/110D, such as via a TCP connection. In this case, metadata 531/621 and application-layer message 510/610 may be encapsulated with header(s) specifying physical address information of host 110A/110B/110C/110D. In the example in FIG. 5, physical IP/MAC header 532 may be addressed from (source physical IP address=IP-A of host-A 110A, source MAC address=MAC-G of a gateway) to (destination physical IP address=IP-B, MAC address=MAC-B) of host-B 110B. In the example in FIG. 6, physical IP/MAC header 632 may be addressed from (IP-A, MAC-G) to host-C 110C (e.g., destination physical IP address=IP-C, MAC address=MAC-C).

Unicast and/or Multicast Packet Handling

It should be understood that examples of the present disclosure may be implemented for unicast and/or multicast packet handling in various scenarios where load balancing is used (as explained using FIGS. 4-6) or otherwise. For example, C4 144 on host-A 110A may communicate with C5 145 on host-B 110B in a unicast manner. In this case, logical endpoint information 420 in FIG. 4 may specify (domain=D2, domain name="xyz.com,"logical IP=IP-5, logical MAC=MAC-5) associated with C5 145. Logical placement endpoint information 430 may specify domain name="xyz.com," host ID=host-B, RDMA(k2, a2) and endpoint ID=(port-1, vlan-1) associated with C5 145. This way, any unicast packet from source=C4 144 may include metadata identifying destination=C5 145. Based on domain=D2 and domain name="xyz.com," C5 145 may be identified at host-B 110B. Alternatively, if a particular physical address is able to uniquely identify the destination endpoint, metadata specifying the domain and domain name may be omitted.

In another example, C4 144 on host-A 110A may communicate with both C3 143 and C7 147 in a multicast manner. In this case, one approach is to send two packets to respective destinations. A first packet that includes metadata associated with C3 143 may be sent to host-C 110C in a unicast manner. A second packet that includes metadata associated with C7 147 may be sent to host-D 110D in a unicast manner. Similarly, logical L2-L4 headers may be omitted according to the examples of the present disclosure. Depending on the desired implementation, a multicast address may be configured, such as "group.bookstore-N" that is mapped to multiple domain names associated with respective logical endpoints (i.e., group members). A packet that is addressed to the multicast address will be forwarded to its group members. Each packet includes any suitable metadata for identifying the destination endpoint.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as a first host or a second host may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to perform packet handling in a software-defined networking (SDN) environment that includes the first host and a second host, the method comprising:

detecting an egress application-layer message from a first logical endpoint supported by the first host, wherein the egress application-layer message is directed towards a virtual domain name that is mapped to a plurality of different virtual domain names having a same domain identifier, wherein the egress application-layer message is encapsulated with a plurality of headers, including a transport-layer header, that are addressed from the first logical endpoint to a second logical endpoint supported by the second host, and wherein the second logical endpoint is associated with a particular virtual domain name amongst the plurality of different virtual domain names;

identifying the second logical endpoint supported by the second host for which the egress application-layer message is destined, wherein the second logical endpoint is identified based on control information that associates the second logical endpoint with at least one attribute specified by the egress application-layer message;

generating an egress packet that includes the egress application-layer message and metadata associated with the second logical endpoint, but omits at least the transport-layer header of the plurality of headers that are addressed from the first logical endpoint to the second logical endpoint, wherein the metadata specifies the domain identifier and the particular virtual domain name to uniquely identify the second logical endpoint; and sending the egress packet to the second host to cause the second host to identify the second logical endpoint based on the metadata, and to send the egress application-layer message to the second logical endpoint.

2. The method of claim 1, wherein generating the egress packet comprises:

generating the egress packet to include the metadata which uniquely associates, within a routing domain having the domain identifier, the second logical endpoint with the at least one attribute specified by the egress application-layer message.

3. The method of claim 1, wherein identifying the second logical endpoint comprises:

obtaining, from a network manager, the control information which associates the at least one attribute specified by the egress application-layer message with a group of logical endpoints that are capable of processing the application-layer message.

4. The method of claim 3, wherein identifying the second logical endpoint comprises:

performing load balancing to select, from the group of logical endpoints, the second logical endpoint to handle the egress application-layer message.

5. The method of claim 1, wherein the plurality of headers, in addition to the transport-layer header, comprises:

an Internet Protocol (IP) header and a media access control (MAC) header.

6. The method of claim 5, wherein generating the egress packet comprises:

generating the egress packet by removing at least one of the IP header and the MAC header from the egress application-layer message, in addition to omission of the transport-layer header.

7. The method of claim 1, wherein detecting the egress application-layer message comprises:

detecting the egress application-layer message via an application programming interface (API) invocation.

8. A non-transitory computer-readable storage medium that includes a set of instructions which, in response to execution by a processor of a computer system, cause the processor to perform a method of packet handling in a software-defined networking (SDN) environment that includes the computer system acting as a first host, and a second host, wherein the method comprises:

detecting an egress application-layer message from a first logical endpoint supported by the computer system, wherein the egress application-layer message is directed towards a virtual domain name that is mapped to a plurality of different virtual domain names having a same domain identifier, wherein the egress application-layer message is encapsulated with a plurality of headers, including a transport-layer header, that are addressed from the first logical endpoint to a second logical endpoint supported by the second host, and wherein the second logical endpoint is associated with a particular virtual domain name amongst the plurality of different virtual domain names;

identifying the second logical endpoint supported by the second host for which the egress application-layer message is destined, wherein the second logical endpoint is identified based on control information that associates the second logical endpoint with at least one attribute specified by the egress application-layer message;

generating an egress packet that includes the egress application-layer message and metadata associated with the second logical endpoint, but omits at least the transport-layer header of the plurality of headers that are addressed from the first logical endpoint to the second logical endpoint, wherein the metadata specifies the domain identifier and the particular virtual domain name to uniquely identify the second logical endpoint; and sending the egress packet to the second host to cause the second host to identify the second logical endpoint based on the metadata, and to send the egress application-layer message to the second logical endpoint.

9. The non-transitory computer-readable storage medium of claim 8, wherein generating the egress packet comprises:

generating the egress packet to include the metadata which uniquely associates, within a routing domain having the domain identifier, the second logical endpoint with the at least one attribute specified by the egress application-layer message.

10. The non-transitory computer-readable storage medium of claim 8, wherein identifying the second logical endpoint comprises:

obtaining, from a network manager, the control information which associates the at least one attribute specified by the egress application-layer message with a group of logical endpoints that are capable of processing the application-layer message.

11. The non-transitory computer-readable storage medium of claim 10, wherein identifying the second logical endpoint comprises:

performing load balancing to select, from the group of logical endpoints, the second logical endpoint to handle the egress application-layer message.

12. The non-transitory computer-readable storage medium of claim 8, wherein the plurality of headers, in addition to the transport-layer header, comprises:

an Internet Protocol (IP) header and a media access control (MAC) header.

13. The non-transitory computer-readable storage medium of claim 12, wherein generating the egress packet comprises:

generating the egress packet by removing at least one of the IP header and the MAC header from the egress application-layer message, in addition to omission of the transport-layer header.

14. The non-transitory computer-readable storage medium of claim 8, wherein detecting the egress application-layer message comprises:

detecting the egress application-layer message via an application programming interface (API) invocation.

15. A computer system configured to perform packet handling in a software-defined networking (SDN) environment that includes the computer system acting as a first host, and a second host, wherein the computer system comprises:

a processor; and a non-transitory computer-readable medium having stored thereon instructions that, in response to execution by the processor, cause the processor to:

detect an egress application-layer message from a first logical endpoint supported by the computer system, wherein the egress application-layer message is directed towards a virtual domain name that is mapped to a plurality of different virtual domain names having a same domain identifier, wherein the egress application-layer message is encapsulated with a plurality of headers, including a transport-layer header, that are addressed from the first logical endpoint to a second logical endpoint supported by the second host, and wherein the second logical endpoint is associated with a particular virtual domain name amongst the plurality of different virtual domain names;

identify the second logical endpoint supported by the second host for which the egress application-layer message is destined, wherein the second logical endpoint is identified based on control information that associates the second logical endpoint with at least one attribute specified by the egress application-layer message;

generate an egress packet that includes the egress application-layer message and metadata associated with the second logical endpoint, but omits at least the transport-layer header of the plurality of headers that are addressed from the first logical endpoint to the second logical endpoint, wherein the metadata specifies the domain identifier and the particular virtual domain name to uniquely identify the second logical endpoint; and send the egress packet to the second host to cause the second host to identify the second logical endpoint based on the metadata, and to send the egress application-layer message to the second logical endpoint.

16. The computer system of claim 15, wherein the instructions that cause the processor to generate the egress packet cause the processor to:

generate the egress packet to include the metadata which uniquely associates, within a routing domain having the domain identifier, the second logical endpoint with the at least one attribute specified by the egress application-layer message.

17. The computer system of claim 15, wherein the instructions that cause the processor to identify the second logical endpoint cause the processor to:

obtain, from a network manager, the control information which associates the at least one attribute specified by the egress application-layer message with a group of logical endpoints that are capable of processing the application-layer message.

18. The computer system of claim 17, wherein the instructions that cause the processor to identify the second logical endpoint cause the processor to:
perform load balancing to select, from the group of logical endpoints, the second logical endpoint to handle the egress application-layer message.

19. The computer system of claim 15, wherein the plurality of headers, in addition to the transport-layer header, comprises:
an Internet Protocol (IP) header and a media access control (MAC) header.

20. The computer system of claim 19, wherein the instructions that cause the processor to generate the egress packet cause the processor to:
generate the egress packet by removing at least one of the IP header and the MAC header from the egress application-layer message, in addition to omission of the transport-layer header.

21. The computer system of claim 15, wherein the instructions that cause the processor to detect the egress application-layer message cause the processor to:
detect the egress application-layer message via an application programming interface (API) invocation.

* * * * *

UNITED STATES PATENT AND TRADEMARK OFFICE
CERTIFICATE OF CORRECTION

PATENT NO. : 11,595,303 B2
APPLICATION NO. : 16/538855
DATED : February 28, 2023
INVENTOR(S) : Yusheng Wang et al.

It is certified that error appears in the above-identified patent and that said Letters Patent is hereby corrected as shown below:

On the Title Page

Item (54) and in the Specification, Column 1, Line 2, delete "NET WORKING" and insert -- NETWORKING --, therefor.

Signed and Sealed this
Thirtieth Day of May, 2023

Katherine Kelly Vidal
*Director of the United States Patent and Trademark Office*